United States Patent
Hori et al.

(10) Patent No.: US 6,533,371 B2
(45) Date of Patent: Mar. 18, 2003

(54) ELASTIC CRAWLER SHOE

(75) Inventors: Kazutoshi Hori, Komatsu (JP); Hiroaki Watanabe, Komatsu (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 09/729,689

(22) Filed: Dec. 6, 2000

(65) Prior Publication Data

US 2003/0034690 A1 Feb. 20, 2003

(30) Foreign Application Priority Data

Dec. 24, 1999 (JP) .......................... 11-366219

(51) Int. Cl.⁷ .................. B62D 55/26; B62D 55/21; B60B 15/00; B60S 1/62
(52) U.S. Cl. .................. 305/191; 305/111; 305/159; 305/177; 305/189
(58) Field of Search .................. 305/111, 112, 305/113, 114, 157, 158, 159, 160, 161, 162, 166, 167, 169, 177, 178, 179, 180, 183, 46, 51, 187, 189, 190, 191, 192, 193, 194

(56) References Cited

U.S. PATENT DOCUMENTS

| | | | | |
|---|---|---|---|---|
| 3,278,244 A | * | 10/1966 | Deffenbaugh et al. | 305/111 |
| 4,094,557 A | * | 6/1978 | Miller | 305/111 |
| 5,482,365 A | * | 1/1996 | Peterson et al. | 305/197 |
| 5,630,657 A | * | 5/1997 | Kumano et al. | 305/189 |
| 5,984,437 A | * | 11/1999 | Katoh | 305/159 |
| 6,079,802 A | * | 6/2000 | Nishimura et al. | 305/157 |

FOREIGN PATENT DOCUMENTS

| | | | |
|---|---|---|---|
| JP | 355-72471 A | * 5/1980 | 305/177 |
| JP | 2-35202 | 9/1990 | |
| JP | 4-342679 | 11/1992 | |
| JP | 6-24367 | 2/1994 | |
| JP | 6-344958 | 12/1994 | |
| JP | 6-344959 | 12/1994 | |
| JP | 6-344960 | 12/1994 | |
| JP | 7-69252 | 3/1995 | |
| JP | 8-48269 | 2/1996 | |
| JP | 11-139359 | 5/1999 | |
| JP | 11-165662 | 6/1999 | |
| JP | 11-171059 | 6/1999 | |
| WO | WO99/12799 | 3/1999 | |

* cited by examiner

Primary Examiner—S. Joseph Morano
Assistant Examiner—Jason R. Bellinger
(74) Attorney, Agent, or Firm—Armstrong, Westerman & Hattori, LLP.

(57) ABSTRACT

With the objective of providing an elastic crawler shoe capable of securing desired ground contact pressure on an icy road or a pressed snow road, thereby preventing a skid, a ground contact face of an elastic body which is bonded to a core bar so as to cover the core bar has grooves, and a central ground contact face in a longitudinal direction of the elastic crawler shoe is provided with stepped parts relative to end portions thereof so as to be protrusively stepped.

11 Claims, 11 Drawing Sheets

(a)

(b)

(a)

(b)

(a)

(b)

(c)

(a)

(b)

(a)

(b)

(c)

(d)

(e)

(f)

(a)　　　　　　　(b)

ELASTIC CRAWLER SHOE

TECHNICAL FIELD

The present invention relates to an elastic crawler shoe suitable for use in a tracklaying vehicle such as a construction machine, an agricultural machine or the like.

BACKGROUND ART

In a conventional tracklaying vehicle such as a bulldozer, a crawler belt made of iron is wound around a plurality of rolling wheels arranged on the upper and lower parts of a track frame and is driven by driven drive sprockets so as to make the vehicle travel. However, a vehicle equipped with such an iron crawler belt damages the surface of a paved public road during traveling. For this reason, recently, what is called a rubber crawler belt system in which many core bars made of metal are embedded in an endless rubber belt at regular intervals and are engaged with the drive sprockets, thereby to drive the belt is often adopted.

However, in the case of this rubber crawler belt, since many core bars are embedded in the endless rubber belt, when the rubber belt is damaged resulting from cracks, exfoliation and the others, the rubber crawler belt as a whole needs to be replaced with a new one, and therefore there were problems that running costs on a user side run up and that time-consuming maintenance is required.

To overcome the foregoing problems, a crawler belt formed in such a manner that many elastic crawler shoes, each of which is comprised of one core bar and an elastic body bonded to the core bar so as to cover the core bar, are arranged in a longitudinal direction of a crawler is proposed, for instance, in Japanese Patent Laid-Open Publication No. 8-48269 (1996), International Publication No. WO99/12799 and the others. In the case of this proposed elastic crawler shoe, even when the elastic body in one of the elastic crawler shoes is damaged, only the damaged shoe can be replaced, and therefore this elastic crawler shoe is advantageous in that running costs and time required for maintenance can be cut down.

However, the above-mentioned known elastic crawler shoe has no particular twist added to a ground contact face of the elastic body since the shoe is designed on the assumption that it is used in all seasons and is therefore problematic in that when used, for example, on an icy road or a pressed snow road in winter, it cannot secure sufficient ground contact pressure, thereby causing a side skid due to a water membrane forming between the elastic body and the ground.

The present invention addresses the problem discussed above, and aims to provide an elastic crawler shoe capable of securing desired ground contact pressure on an icy road and a pressed snow road, thereby preventing a skid, and improving traveling stability and tractive performance of a tracklaying vehicle.

SUMMARY OF THE INVENTION

The above object can be achieved by an elastic crawler shoe according to a first aspect of the invention, the elastic crawler shoe comprising a core bar fixed directly or through an iron shoe to crawler belt links, each of which is endlessly coupled, and an elastic body bonded to the core bar so as to cover the core bar, wherein the elastic body has a ground contact face having grooves or incisions.

According to the first aspect of the invention, in the elastic crawler shoe, the ground contact face of the elastic body has the grooves or the incisions, and therefore when the elastic crawler shoe is used on an icy road or a pressed snow road, edges of each of the grooves or the incisions scrape off a water membrane forming on the ice, and the thus-scraped water is stored in the groove or the incision. The removal of water membrane from the icy road or the pressed snow road thus increases gripping force of the elastic body relative to the road surface, thereby enhancing an anti-skid effect. As a result, traveling stability and tractive performance of a tracklaying vehicle can be improved.

An elastic crawler shoe according to a second aspect of the invention meets the first aspect of the invention and is further characterized in that in cases where the elastic body has the grooves, the grooves in the end portions in a longitudinal direction of the elastic crawler shoe are longer in length than the grooves in the central portion thereof. Thus, a ground contact area of the elastic body is secured in the central portion where ground contact pressure is relatively high, and in the elastic body, occurrence of cracks which start from the grooves in the central portion can be prevented.

An elastic crawler shoe according to a third aspect of the invention meets the first and second aspects of the invention and is further characterized in that the bottom of at least one of the grooves is provided with a wear indicator indicative of a wear limit of the elastic body. The wear limit of the elastic body, that is, a limit beyond which the anti-skid effect cannot be obtained is thus understood and is therefore effective in confirming right timing for replacement of the crawler shoe at a glance. In cases where a central ground contact face in the longitudinal direction of the crawler shoe is protrusively stepped, the wear indicator is so formed that its top face is flush with the end portions in the longitudinal direction of the crawler shoe.

An elastic crawler shoe according to a fourth aspect of the invention meets the first aspect of the invention and is further characterized in that in cases where the elastic body has the incisions, the central portion in the longitudinal direction of the elastic crawler shoe is more densely provided with the incisions than the end portions thereof. The incisions are inferior to the grooves in capacity for storing water scraped off from the icy road or the pressed snow road, and therefore in order to increase water membrane removing ability of the central portion where ground contact pressure is high, the central portion is effectively, more densely provided with the incisions.

An elastic crawler shoe according to a fifth aspect of the invention comprises a core bar fixed directly or through an iron shoe to crawler belt links, each of which is endlessly coupled, and an elastic body bonded to the core bar so as to cover the core bar, wherein a central ground contact face in a longitudinal direction of the elastic crawler shoe is provided with stepped parts relative to end portions thereof so that the central ground contact face and the stepped parts can take the form of a convexity.

According to the fifth aspect of the invention, the stepped parts and the central ground contact face in the longitudinal direction of the elastic crawler shoe take the form of a convexity relative to the end portions thereof, and therefore when the elastic crawler shoe is used on the icy road, imposed load can be concentrated on the central portion in the longitudinal direction of the crawler shoe, thereby increasing ground contact pressure in the central portion and gripping force of the elastic body relative to the road surface.

On the other hand, when the elastic crawler shoe is used on a snowy road, the elastic body engages the ground with its entire face including the central ground contact face, the stepped parts and the end portions, so that a ground contact area can be secured, and increased gripping force relative to the snowy road can be obtained. In this manner, desired effects can be obtained on both the icy road and the snowy road.

An elastic crawler shoe according to a sixth aspect of the invention meets the fifth aspect of the invention and is further characterized in that the stepped parts each have grooves or incisions oriented in a direction transverse to the longitudinal direction of the elastic crawler shoe. Thus, the edges of each of the grooves or the incisions provided in each of the stepped parts each assume a gripping function with respect to the icy road, so that an effect of preventing a side skid and the like can be enhanced.

An elastic crawler shoe according to a seventh aspect of the invention meets the fifth and sixth aspects of the invention and is further characterized in that a starting point of each of the stepped parts is provided so as to be in alignment with or deviate outwardly from each end of a flat part of the core bar. Thus, the elastic body's stepped-downward part which has a great influence on ground contact pressure can substantially be in alignment with a portion of the elastic body, the portion corresponding to the core bar's flat part where ground contact pressure is high, so that ground contact pressure relative to the icy road in particular increases, thereby increasing gripping force.

An elastic crawler shoe according to an eighth aspect of the invention comprises a core bar fixed directly or through an iron shoe to crawler belt links, each of which is endlessly coupled, and an elastic body bonded to the core bar so as to cover the core bar, wherein a central ground contact face in a longitudinal direction of the elastic crawler shoe is formed out of a material harder than a material used for formation of end portions thereof.

According to the eighth aspect of the invention, the central ground contact face of the crawler shoe is formed out of a hard material, and therefore the central portion in the longitudinal direction of the crawler shoe can bite well into the icy road to exert a spike effect, thereby providing increased gripping force relative to the icy road.

An elastic crawler shoe according to a ninth aspect of the invention comprises a core bar fixed directly or through an iron shoe to crawler belt links, each of which is endlessly coupled, and an elastic body bonded to the core bar so as to cover the core bar, wherein the elastic body has a laminated structure so that its ground contact face side portion can be formed out of a soft material while its core bar side portion can be formed out of a hard material.

According to the ninth aspect of the invention, the ground contact face side portion of the elastic body is formed out of a soft material, and therefore its adhesive effect with respect to the icy road causes gripping force, thereby preventing a skid relative to the road surface. On the other hand, the core bar side portion is formed out of a hard material, and therefore reduced ground contact pressure relative to the snowy road can be obtained.

An elastic crawler shoe according to a tenth aspect of the invention comprises a core bar fixed directly or through an iron shoe to crawler belt links, each of which is endlessly coupled, and an elastic body bonded to the core bar so as to cover the core bar, wherein the elastic body is so formed that its ground contact area gradually reduces from the central portion in a longitudinal direction of the elastic crawler shoe toward the end portions thereof, and a slant face in each section orthogonal to the longitudinal direction of the elastic crawler shoe is formed into a circular arc.

According to the tenth aspect of the invention, the ground contact area of the elastic body gradually reduces from the central portion in the longitudinal direction of the elastic crawler shoe toward the end portions thereof, and therefore when the elastic crawler shoe is used on the pressed snow road, the increased amount of snow can be held between the adjacent elastic crawler shoes, so that increased gripping force relative to the road surface can be obtained. Moreover, since the slant face in each section orthogonal to the longitudinal direction of the elastic body is formed into a circular arc, when used on the icy road, an edge portion of each of the slant faces can be held nearly at right angles to the ground contact face of the elastic body and therefore bites well into the road, thereby increasing gripping force relative to the road surface.

DESCRIPTION OF THE PREFERRED EMBODIMENTS

Preferred embodiments of the present invention are concretely demonstrated hereinafter with reference to the accompanying drawings.

First Embodiment

Figure 1:
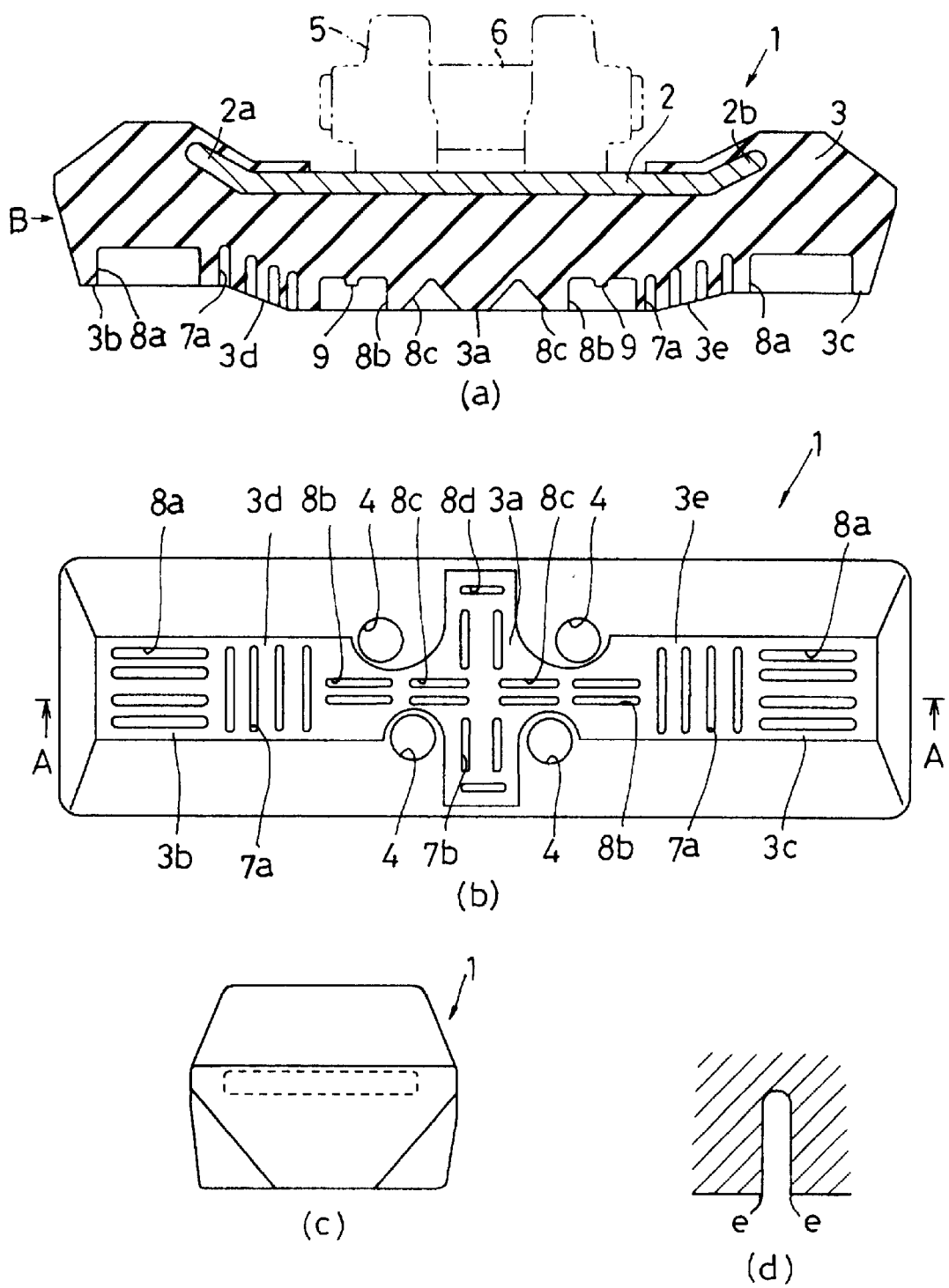
FIGS. 1(a), 1(b) and 1(c) area a cross-sectional view (a sectional view taken along line A—A in FIG. 1(b)), a bottom plan view and a view when seen from arrow B in FIG. 1(a), respectively, of an elastic crawler shoe in accordance with a first embodiment of the present invention.
FIG. 1(d) is an example of the shape of a groove in section.

FIGS. 1(a), 1(b) and 1(c) are a cross-sectional view (a sectional view taken along line A—A in FIG. 1(b)), a bottom plan view and a view when seen from arrow B in FIG. 1(a), respectively, of an elastic crawler shoe in accordance with a first embodiment of the present invention, and FIG. 1(d) is an example of the shape of a groove in section.

An elastic crawler shoe 1 in accordance with the present embodiment has a structure in which an elastic body 3 made of rubber or the like is bonded to a core bar 2 so as to cover the core bar 2. The elastic crawler shoe 1 is directly fixed to crawler belt links 5 by means of bolts (not shown) inserted in bolt insertion holes 4 defined in the elastic body 3. A crawler belt as a whole is constructed in such a manner that many of the elastic crawler shoes 1 are arranged in parallel in a traveling direction of a crawler, and that each end of each of the crawler belt links 5 is rotatably coupled to each end of each of the next crawler belt links 5 by means of a pin 6. The crawler belt is rotatively driven by the crawler belt links 5 which are driven by engaging with sprockets (not shown), so that a tracklaying vehicle travels.

The core bar 2 is made of a material of high rigidity so that it will not become deformed even when vehicle body weight is imposed thereon. The examples of such a material include common core bar materials such as steel, cast steel, cast iron and the like and materials such as metallic composite materials, non-metallic composite materials and the others. End portions 2a, 2b of the core bar 2 are each bent at a required angle toward a non-ground contact face of the elastic crawler shoe 1.

The elastic body 3 is made of a relatively soft material such as rubber, urethane, resin, an elastomer, a non-metallic composite material or the like. It should be noted that in cases where the elastic body 3 is made of rubber, vulcanization-bonding, which is a common method, or the like is used to embed the core bar 2 in the elastic body 3. In the elastic body 3, a central ground contact face 3a in a width direction of the crawler belt (a longitudinal direction of the crawler shoe 1) is provided with stepped parts 3d, 3e relative to end portions 3b, 3c so that the central ground contact face and the stepped parts can be protrusively stepped. Moreover, end portions of the elastic body 3 on its non-ground contact face side are bent at a required angle toward the non-ground contact face so as to fit the bent shape of the core bar 2, and the non-ground contact face side of each of the end portions 2a, 2b of the core bar 2 is covered with the elastic body 3 by bonding.

In the present embodiment, the core bar 2 is shorter than the elastic body 3 in length in the longitudinal direction of the crawler shoe 1. Thus, in a place where the core bar 2 is disposed, load is directly transferred to a ground contact face of the crawler shoe 1, so that increased ground contact pressure in the central portion in the longitudinal direction of the crawler shoe 1 can be obtained. In this manner, gripping force of the elastic crawler shoe 1 relative to both an icy road and a pressed snow road can be secured, and an anti-skid effect is thus exerted. When the elastic crawler shoe 1 is used on the icy road, the elastic body 3 is bent by pressure from the hard road surface, and contact pressure in the end portions of the elastic body 3 where the core bar 2 is not disposed becomes nearly zero. Moreover, when the elastic crawler shoe 1 is used on a snowy road, owing to rigidity of the elastic body 3, reduced ground contact pressure can be provided for the crawler shoe 1 as a whole.

As is clear from FIGS. 1(b) and 1(c), the central ground contact face 3a of the elastic body 3 has a flatly formed central portion in the longitudinal direction of the elastic crawler shoe 1, the central portion extending over nearly the entire width in a width direction of the elastic crawler shoe 1, and the other portions of the central ground contact face 3a, the stepped parts 3d, 3e and the end portions 3b, 3c each have a flatly-formed central portion in the width direction of the elastic crawler shoe 1, while their end portions in the width direction of the elastic crawler shoe 1 are slantly cut away. The elastic crawler shoe 1 thus has the cross-shaped ground contact face (see FIG. 1(b)). As described above, the central portion of the central ground contact face 3a is flatly formed in the width direction, so that a side skid of the elastic crawler shoe 1 can be prevented. Moreover, since the respective end portions of the portions of the central ground contact face 3a excluding the central portion thereof, the respective end portions of the stepped parts 3d, 3e and the respective end portions of the end portions 3b, 3c are slantly cut away, when the elastic crawler shoe 1 is used on the pressed snow road, the cut-away portions of the adjacent elastic crawler shoes 1, 1 are opposed to each other, thereby forming a space to hold a large amount of snow.

The ground contact face of the elastic body 3 has many grooves (or holes) (i.e., longitudinal grooves 7a, 7b and transverse grooves 8a, 8b, 8c, 8d). In the present embodiment, the grooves 7a, 7b, 8a through 8d are long and narrow in a plan view and are substantially rectangular or substantially triangular in section. Their bottom corners are round, while, like the one shown in FIG. 1(d), their bottoms are round in section. Moreover, it is better that the ends of each of the grooves be also round. By virtue of the round bottom corner and the round bottom in section, cracks resulting from distortion concentrating on the bottom corner or the bottom can be prevented from occurring.

The longitudinal grooves 7a, 7b and the transverse grooves 8a through 8d work in such a manner that their respective edges e (see FIG. 1(d)) scrape off a water membrane forming on the ice, and that the water thus scraped off is stored in the grooves. The water membrane is thus removed from the icy road, and consequently, increased gripping force of the elastic body 3 relative to the road surface is obtained. Here, the longitudinal grooves 7a, 7b exert an anti-side skid effect by means of their gripping force in a transverse direction (a direction orthogonal to the traveling direction) of the crawler belt, while the transverse grooves 8a through 8d exert an anti-longitudinal skid effect by means of their gripping force in a longitudinal direction (the traveling direction) of the crawler belt. The longitudinal grooves 7a formed in each of the stepped parts 3d, 3e are particularly provided in contemplation of the anti-side skid effect. It should be noted that the longitudinal grooves 7a formed in each of the stepped parts 3d, 3e need not always be provided, as shown in the drawing, in a direction orthogonal to the longitudinal direction of the crawler shoe 1 as long as they are oriented in a direction transverse to the longitudinal direction thereof.

The grooves 7a, 8a in the end portions in the longitudinal direction of the elastic crawler shoe 1 are longer in length than the grooves 7b, 8b, 8c, 8d in the central portion thereof. A reason for this is to secure a ground contact area in the central portion where ground contact pressure is relatively high, thereby to provide increased rigidity of the elastic body 3. Thus, occurrence of cracks which start from the thus-configured grooves 7b, 8b, 8c, 8d in the central portion can be prevented.

Moreover, the bottom of each of the grooves (transverse grooves 8b in the present embodiment) in the above-mentioned central portion is provided with a wear indicator 9 indicative of a wear limit of the elastic body 3. The wear indicator 9 is so formed that its top face is flush with the flatly-formed central portion of each of the end portions 3b, 3c. In this manner, the wear limit of the elastic body 3 can be understood at a glance, and the wear indicator 9 serves as an index of right timing for replacement of the crawler shoe 1.

In the present embodiment, the grooves 7a, 7b, 8a through 8d that are substantially rectangular or substantially triangular in section have been explained. However, they may be substantially trapezoidal or substantially semicircular in section. In the case of such grooves, it is preferable that they are formed so as to narrow inward.

Figure 2:
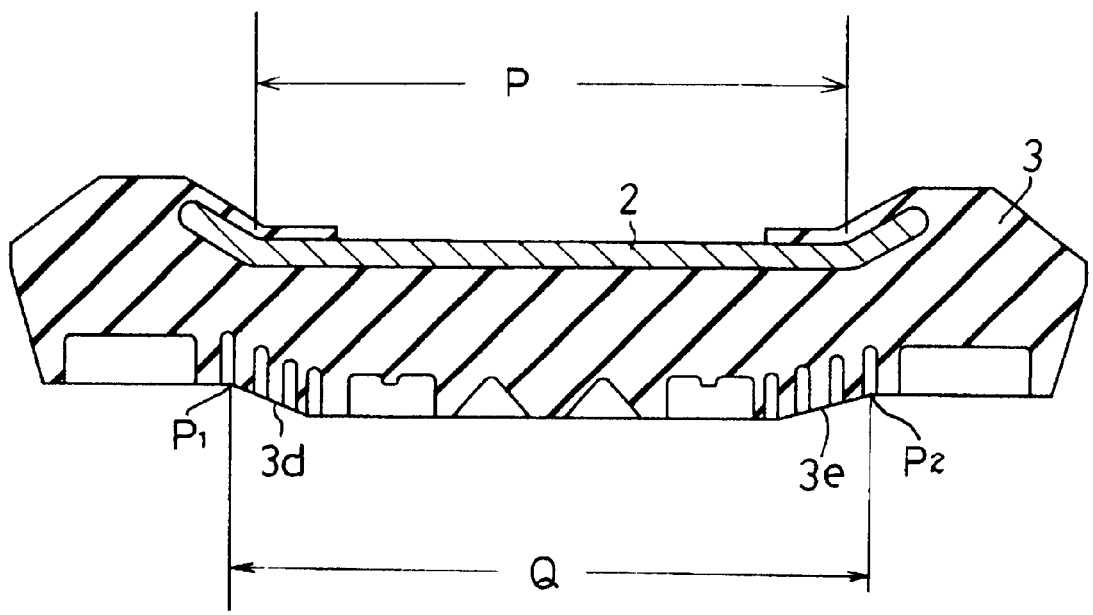
FIG. 2 shows a relationship between the length of a core bar and the length of a stepped-downward part in accordance with the first embodiment.

In the elastic crawler shoe 1 in accordance with the present embodiment, as shown in FIG. 2, respective starting points P, $P_2$ of the stepped parts 3d, 3e are provided so as to be in alignment with or deviate outwardly from the ends of a flat part of the core bar 2, respectively. In other words, the elastic crawler shoe 1 is so designed that $P \leq Q$ holds. Thus, a stepped-downward part (a part corresponding to the length Q) of the elastic body 3, the stepped-downward part having a great influence on ground contact pressure, can substantially be in alignment with a portion of the elastic body 3, the portion corresponding to the flat part (a part corresponding to the length P) of the core bar 2 where ground contact pressure is high, so that ground contact pressure relative to the icy road in particular increases, thereby increasing gripping force relative to the road surface.

In the present embodiment, usable examples of a material of the elastic body 3 having the ground contact face include, besides the above-mentioned materials, rubber in which short fiber such as nylon or the like is embedded, rubber in which small pieces of steel are embedded, rubber in which ceramics are embedded, rubber in which walnut shells are embedded, rubber in which ultrahigh molecular polyethylene is embedded, rubber in which silica sands are embedded, rubber in which resin that cures at a low temperature (below the freezing point) is embedded, foam rubber and the like.

Second Embodiment

Figure 3:
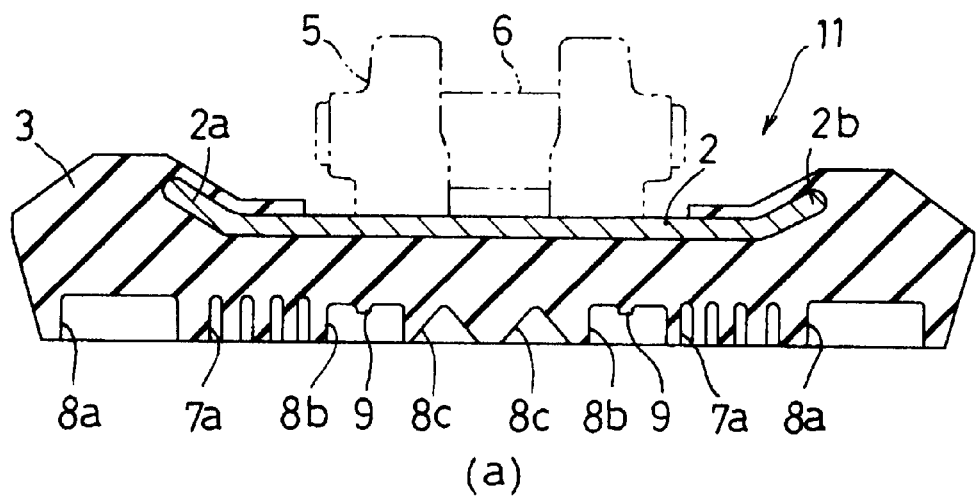
FIG. 3(a) is a cross-sectional view (a sectional view taken along line A—A in FIG. 3(b)) of an elastic crawler shoe in accordance with a second embodiment of the present invention.
FIG. 3(b) is a bottom plan view of the same.
Figure 3:
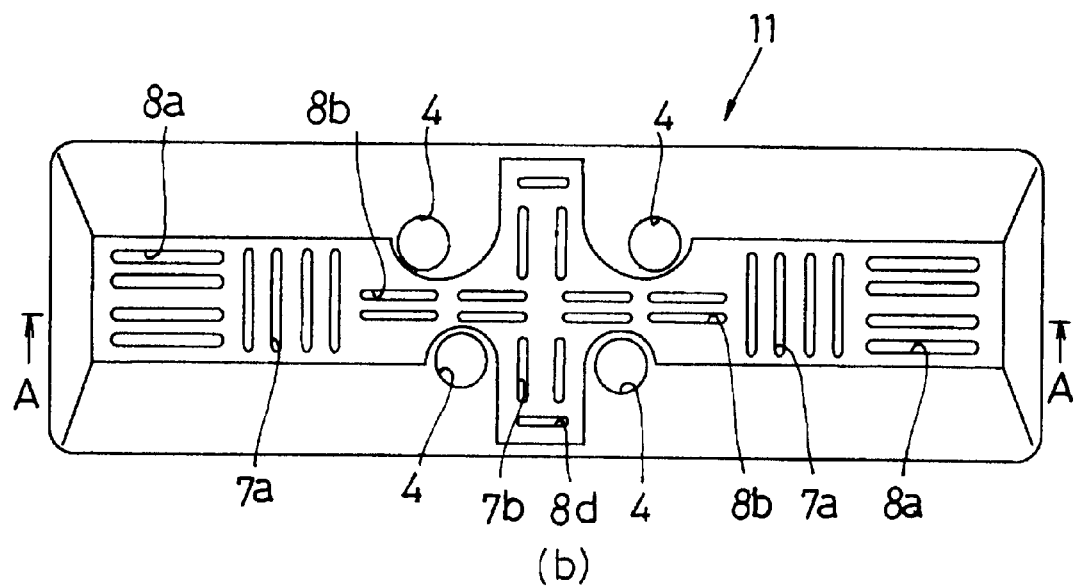

FIG. 3(a) is a cross-sectional view (a sectional view taken along line A—A in FIG. 3(b)) of an elastic crawler shoe in accordance with a second embodiment of the present invention, and FIG. 3(b) is a bottom plan view of the same.

A ground contact face of an elastic crawler shoe 11 in accordance with the present embodiment does not have the stepped parts 3d, 3e that the elastic crawler shoe 1 in accordance with the first embodiment has, but is flatly formed. The other configurations basically do not differ from those of the first embodiment. Accordingly, parts similar to those of the first embodiment are assigned the same reference numerals as those of the first embodiment, and their detailed explanation is omitted.

According to the present embodiment, the stepped parts 3d, 3e as configured in the first embodiment are not provided, and therefore where a working effect (an effect of increasing contact pressure in the central portion in the longitudinal direction of the crawler shoe) obtained by the stepped parts 3d, 3e and a working effect (an effect of preventing a side skid relative to the icy road) obtained by the longitudinal grooves 7a formed in these stepped parts 3d, 3e are concerned, the elastic crawler shoe 11 is inferior to that of the first embodiment. However, the other working effects that can be obtained are substantially the same as those obtained in the first embodiment.

Third Embodiment

Figure 4:
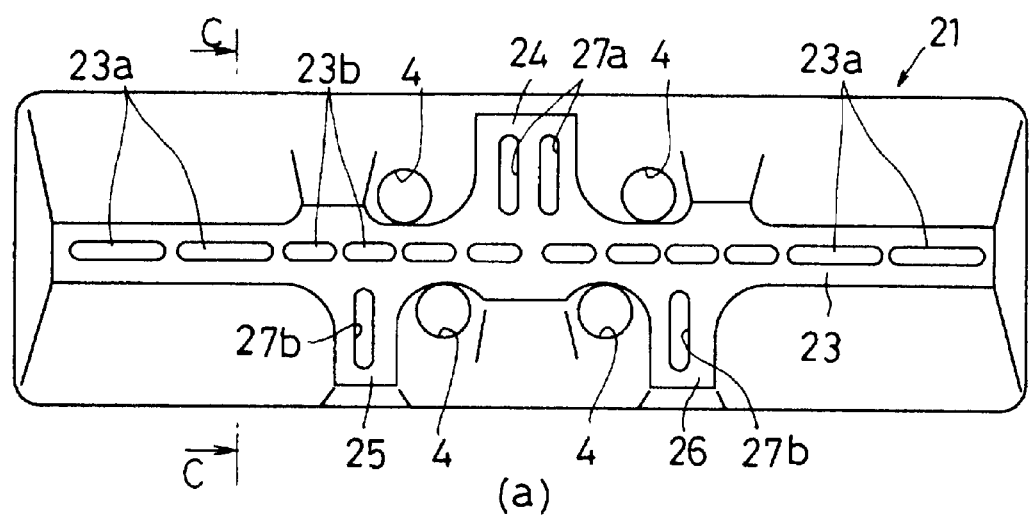
FIG. 4(a) is a bottom plan view of an elastic crawler shoe in accordance with a third embodiment of the present invention.
FIG. 4(b) is a sectional view taken along line C—C in FIG. 4(a).
Figure 4:
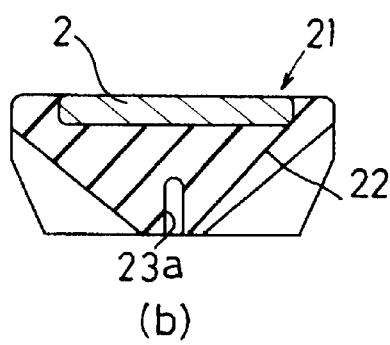

FIG. 4(a) is a bottom plan view of an elastic crawler shoe in accordance with a third embodiment of the present invention, and FIG. 4(b) is a sectional view taken along line C—C in FIG. 4(a).

In an elastic crawler shoe 21 in accordance with the present embodiment, similarly to the second embodiment, a ground contact face of an elastic body 22 is flatly formed. However, the ground contact face differs from that of the second embodiment in shape, and its area is smaller than that of the second embodiment. In addition, the ground contact face has transverse grooves 23a, 23b which are formed so as to align in series on a ground contact face 23 which is formed so as to be long and narrow in a longitudinal direction of the crawler shoe 21, longitudinal grooves 27a formed on a ground contact face 24 protrusively provided in a width direction of the crawler shoe 21 and longitudinal grooves 27b formed on ground contact faces 25, 26 which are also protrusively provided in the width direction of the crawler shoe 21. Here, the grooves 23a in the end portions in the longitudinal direction of the crawler shoe 21 are longer in length than the grooves 23b in the central portion thereof.

In the case of the present embodiment, the area of the ground contact face is reduced, so that ground contact pressure increases accordingly. However, rigidity of the elastic body 22 inevitably reduces accordingly.

Fourth Embodiment

Figure 5:
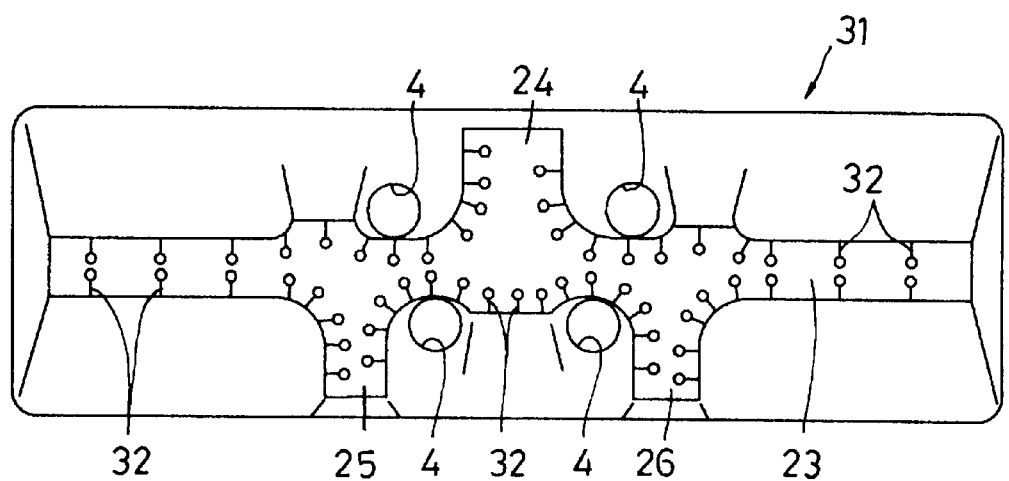
FIG. 5 is a bottom plan view of an elastic crawler shoe in accordance with a fourth embodiment of the present invention.

FIG. 5 is a bottom plan view of an elastic crawler shoe in accordance with a fourth embodiment of the present invention.

In an elastic crawler shoe 31 in accordance with the present embodiment, a flat ground contact face has the same shape as that of the third embodiment; however, it has incisions 32, in place of grooves 23a, 23b, 27a, 27b as given in the third embodiment. Specifically, the central portion in a longitudinal direction of the elastic crawler shoe 31 is more densely provided with the incisions 32 than the end portions thereof. The incisions 32 are somewhat inferior to the grooves in capacity for storing water scraped off from an icy road or a pressed snow road, and therefore in order to increase water membrane removing ability of the central portion where ground contact pressure is high, the central portion is effectively, more densely provided with the incisions 32. On the other hand, the end portions are less densely provided with the incisions 32 for the purpose of giving priority to securing of the elastic body's rigidity. It should be noted that the terminal end of each of the incisions 32 is circularly formed so as to prevent occurrence of cracks which start from the incisions 32.

Fifth Embodiment

Figure 6:
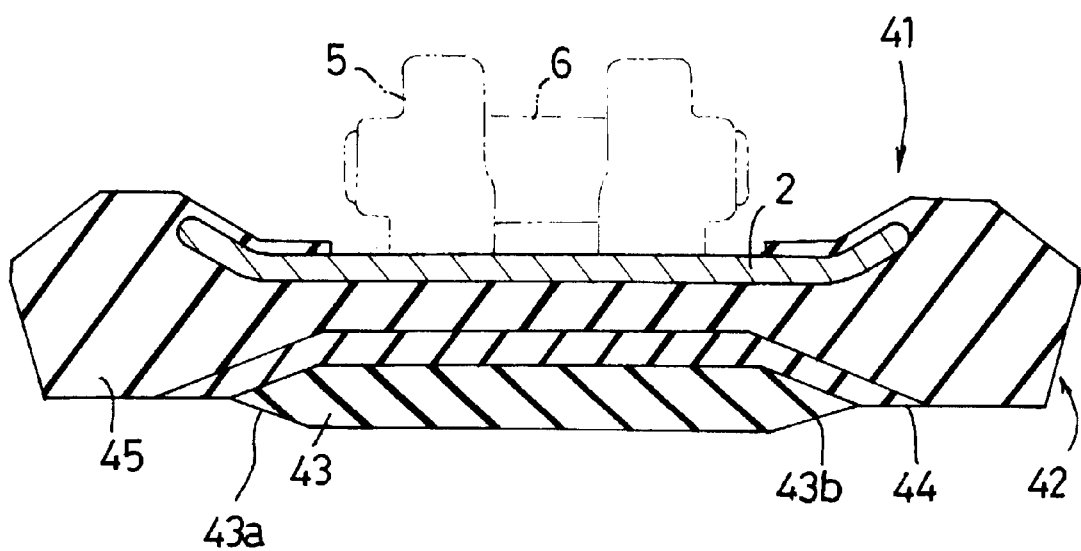
FIG. 6 is a cross-sectional view of an elastic crawler shoe in accordance with a fifth embodiment of the.present invention.

FIG. 6 is a cross-sectional view of an elastic crawler shoe in accordance with a fifth embodiment of the present invention.

In an elastic crawler shoe 41 in accordance with the present embodiment, an elastic body 42 has a three-layer structure in which a first elastic body 43 made of a soft material, a second elastic body 44 made of a material harder than the first elastic body 43 and a third elastic body 45 made of a material harder than the second elastic body 44 are layered in this order from its ground contact face to the core bar 2. In addition, similarly to the first embodiment, the elastic body 42 (the first elastic body 43) is provided with stepped parts 43a, 43b so that the central portion in a longitudinal direction of the crawler shoe 41 can be protrusively stepped.

According to the present embodiment, since the first elastic body 43 in the central portion is made of a soft material, its adhesive effect with respect to an icy road causes gripping force, thereby preventing a skid relative to the road surface. On the other hand, since the second elastic body 44 and the third elastic body 45 on the core bar side are each made of a hard material, reduced ground contact pressure relative to a snowy road can be obtained.

Sixth Embodiment

Figure 7:
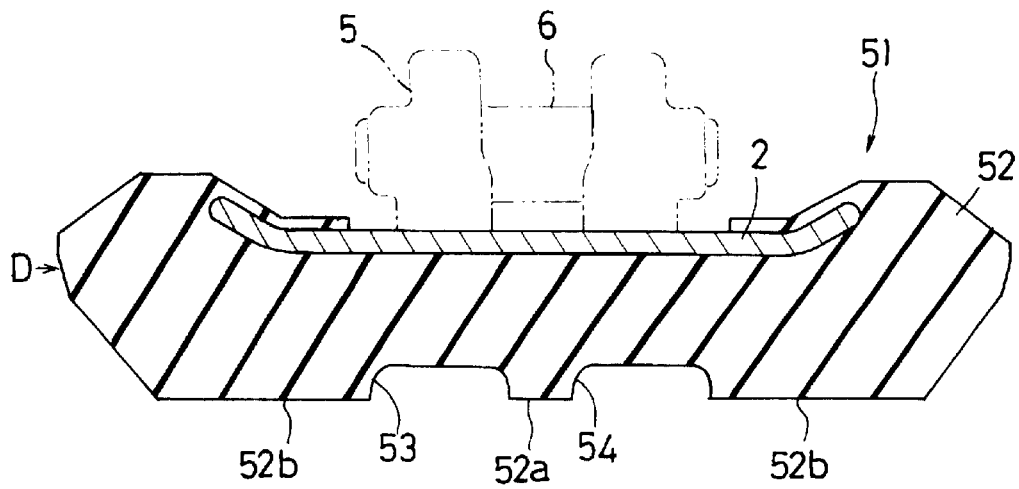
FIGS. 7(a), 7(b) and 7(c) are a cross-sectional view (a sectional view taken along line E—E in FIG. 7(b)), a bottom plan view and a view when seen from arrow D in FIG. 7(a), respectively, of an elastic crawler shoe in accordance with a sixth embodiment of the present invention.
Figure 7:
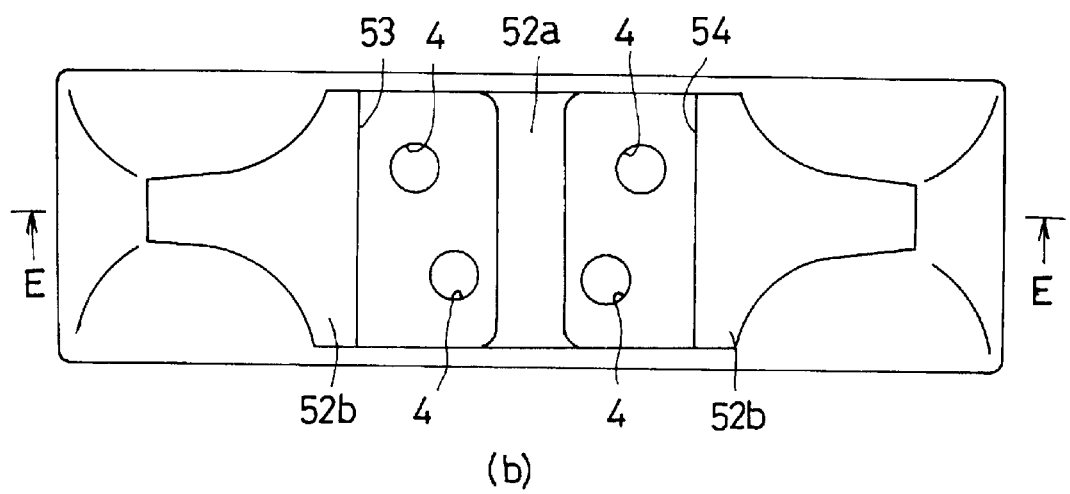
Figure 7:
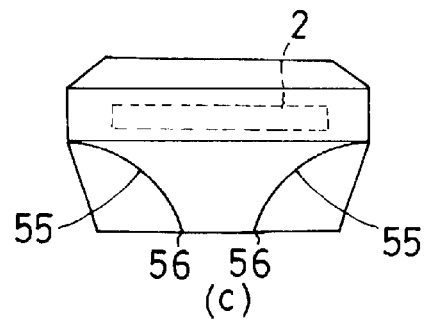

FIGS. 7(a), 7(b) and 7(c) are a cross-sectional view (a sectional view taken along line E—E in FIG. 7(b)), a bottom plan view and a view when seen from arrow D in FIG. 7(a), respectively, of an elastic crawler shoe in accordance with a sixth embodiment of the present invention.

In an elastic crawler shoe 51 in accordance with the present embodiment, a ground contact face of an elastic body 52 is divided into a central ground contact face 52a and side ground contact faces 52b, 52b, defining two concavities 53, 54, which are parallel to each other, in a width direction of the crawler shoe 51 as boundaries. The side ground contact faces 52b, 52b of the elastic body 52 are so formed that their areas gradually reduce from the central portion in a longitudinal direction of the crawler shoe 51 toward the end portions thereof, respectively, and that a slant face 55 in each section orthogonal to the longitudinal direction of the crawler shoe 51 is formed into a circular arc.

According to the present embodiment, since the area of the central ground contact face 52a of the elastic body 52 is small, the central ground contact face 52a bites well into an icy road to exert a spike effect, thereby increasing gripping force relative to the icy road. Moreover, since the area of each of the side ground contact faces 52b, 52b of the elastic body 52 gradually reduces from the central portion in the longitudinal direction of the crawler shoe 51 toward the end portion thereof, the increased amount of snow can be held between the adjacent elastic crawler shoes 51, 51 when they are used on a pressed snow road, and increased gripping force relative to the road surface can thus be obtained. Furthermore, since the slant face 55 in each section orthogonal to the longitudinal direction of the elastic body 52 is formed into a circular arc, when used on the icy road, an edge portion 56 of each of the slant faces 55 can be held nearly at right angles to the ground contact face of the elastic body 52 and therefore bites well into the road, thereby increasing gripping force relative to the road surface.

Seventh Embodiment

Figure 8:
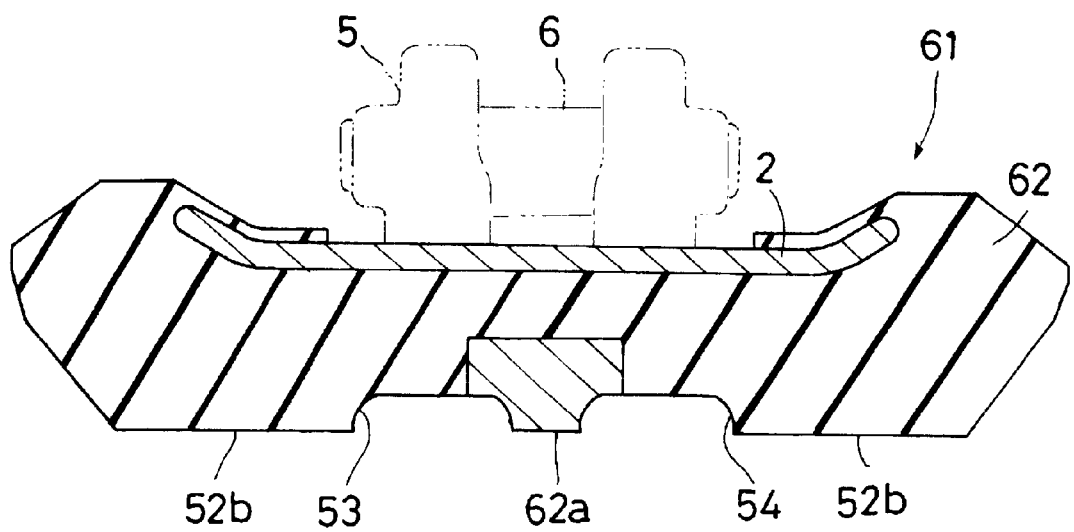
FIG. 8 is cross-sectional view of an elastic crawler shoe in accordance with a seventh embodiment of the present invention.

FIG. 8 is cross-sectional view of an elastic crawler shoe in accordance with a seventh embodiment of the present invention.

In an elastic crawler shoe 61 in accordance with the present embodiment, the detail that differs from that of the foregoing sixth embodiment is that a central portion 62a of an elastic body 62 is formed out of a material harder than a material used for formation of a peripheral portion thereof. Thus, the central portion 62a more effectively bites into an icy road, and a spike effect is brought to the fore accordingly.

Eighth Embodiment

Figure 9:
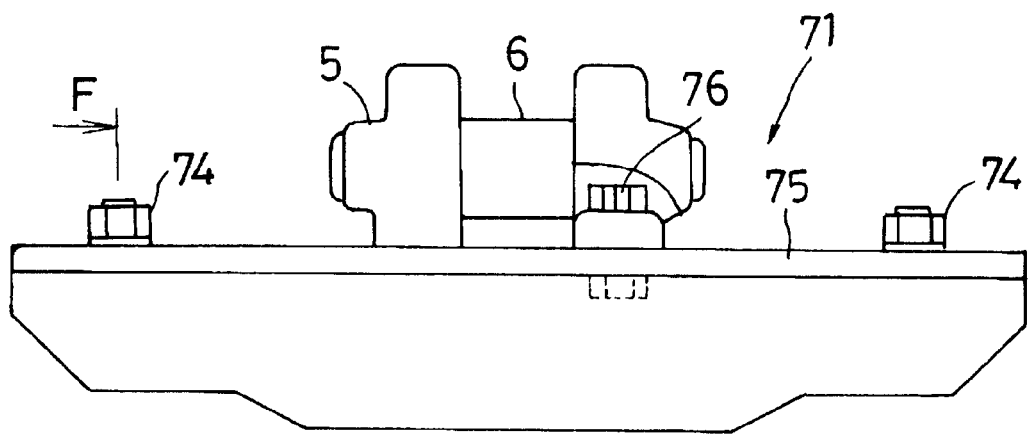
FIG. 9(a) is a front view of an elastic crawler shoe in accordance with an eighth embodiment of the present invention.
FIG. 9(b) is a sectional view taken along line F—F in FIG. 9(a).
Figure 9:
Figure 9:
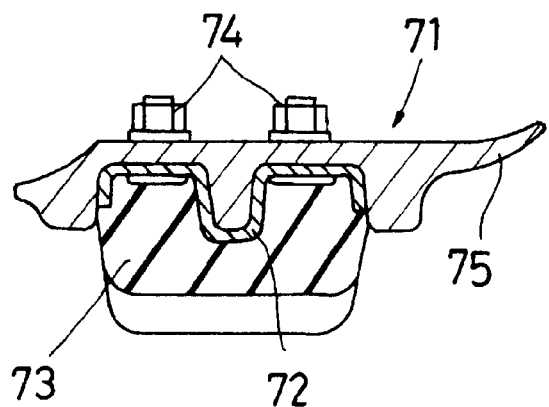

FIG. 9(a) is a front view of an elastic crawler shoe in accordance with an eighth embodiment of the present invention, and FIG. 9(b) is a sectional view taken along line F—F in FIG. 9(a).

In each of the foregoing embodiments, the elastic crawler shoe whose core bar 2 is fixed directly to the crawler belt links 5, each of which is endlessly coupled, by means of the bolts has been explained. However, in the present embodiment, a pad which is formed in such a manner that an elastic body 73 is bonded to a core bar 72 is fixed to an iron shoe 75 by means of four bolts 74 protruding out from the pad, and the iron shoe 75 is fixed to crawler belt links 5 by means of a bolt 76. Such a fixing method is applicable to the elastic crawler belt in accordance with each of the foregoing embodiments.

Figure 10:
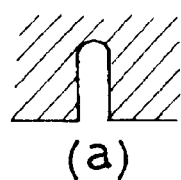
FIGS. 10(a) through 10(f) are modified examples of the shape of the groove.
Figure 10:
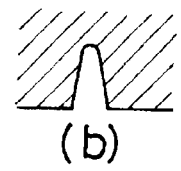
Figure 10:
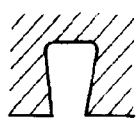
Figure 10:
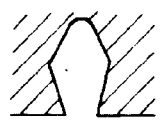
Figure 10:
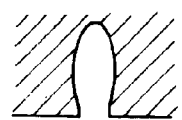
Figure 10:

Moreover, in the foregoing embodiments (i.e., the first, second and third embodiments) in which the ground contact face of the elastic body has the grooves, the straight grooves, like the one shown in FIG. 10(a), or the grooves narrowing inward, like the one shown in FIG. 10(b), have been adopted. However, as shown in FIGS. 10(c), 10(d), 10(e) and 10(f), grooves which widens inward can also be adopted. With such types of shape, the increased amount of water can be stored in the grooves, while durability of the elastic body at the ground contact face can be maintained, and consequently, increased gripping force of the elastic body relative to an icy road can be obtained.

Figure 11:
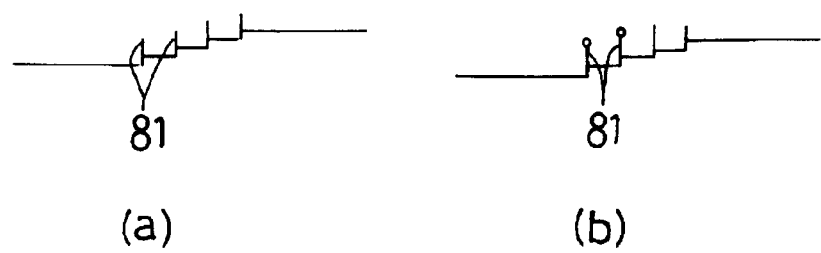
FIGS. 11(a) and 11(b) are modified examples of the shape of a stepped part.

In the foregoing embodiment (i.e., the first embodiment) in which the ground contact face of the elastic body is provided with the stepped parts each having the grooves, the stepped parts are sloped. However, as shown in FIGS. 11(a) and 11(b), each of the stepped parts can be formed into a stairway, and an incision 81 is provided so as to be in alignment with each step of the stairway. In this case, as shown in FIG. 11(b), the terminal end of each of the incisions 81 is circularly formed, so that concentration of distortion on the terminal end of each of the incisions 81 and occurrence of cracks which start from the incisions 81 can be prevented.

What is claimed is:

1. An elastic crawler shoe comprising a core bar fixed directly or through an iron shoe to crawler belt links, each of which is endlessly coupled, and a single piece elastic body bonded to the core bar so as to cover the core bar,
wherein the single piece elastic body has a ground contact face having a plurality of grooves or incisions.

2. An elastic crawler shoe comprising a core bar fixed directly or through an iron shoe to crawler belt links, each of which is endlessly coupled, and a single piece elastic body bonded to the core bar so as to cover the core bar, wherein
the single piece elastic body has a ground contact face having grooves or incisions, and
the grooves in end portions in a longitudinal direction of the elastic crawler shoe are longer in length than the grooves in a central portion thereof.

3. An elastic crawler shoe comprising a core bar fixed directly or through an iron shoe to crawler belt links, each of which is endlessly coupled, and an elastic body bonded to the core bar so as to cover the core bar, wherein
the elastic body has a ground contact face having grooves or incisions, and
a surface closest to the core bar of at least one of the grooves is provided with a wear indicator indicative of a wear limit of the elastic body.

4. An elastic crawler shoe comprising a core bar fixed directly or through an iron shoe to crawler belt links, each of which is endlessly coupled, and a single piece elastic body bonded to the core bar so as to cover the core bar, wherein
the single piece elastic body has a ground contact face having grooves or incisions, and
a central portion in the longitudinal direction of the elastic crawler shoe is more densely provided with the incisions than end portions thereof.

5. An elastic crawler shoe comprising a core bar fixed directly or through an iron shoe to crawler belt links, each of which is endlessly coupled, and an elastic body bonded to the core bar so as to cover the core bar, wherein a central ground contact face in a longitudinal direction of the elastic crawler shoe is provided with stepped parts relative to end portions thereof so that the central ground contact face and the stepped parts are convex, and the stepped parts each have grooves or incisions oriented in a direction transverse to the longitudinal direction of the elastic crawler shoe.

6. An elastic crawler shoe comprising a core bar fixed directly or through an iron shoe to crawler belt links, each of which is endlessly coupled, and an elastic body bonded to the core bar so as to cover the core bar, wherein a central ground contact face in a longitudinal direction of the elastic crawler shoe is provided with stepped parts relative to end portions thereof so that the central ground contact face and the stepped parts are convex, and a starting point of each of the stepped parts is provided so as to be in alignment with or deviate outwardly from each end of a flat part of the core bar.

7. An elastic crawler shoe comprising a core bar fixed directly or through an iron shoe to crawler belt links, each of which is endlessly coupled, and a single piece elastic body bonded to the core bar so as to cover the core bar, wherein a central ground contact face in a longitudinal direction of the elastic crawler shoe is formed out of a material harder than a material used for formation of end portions thereof.

8. An elastic crawler shoe comprising a core bar fixed directly or through an iron shoe to crawler belt links, each of which is endlessly coupled, and an elastic body bonded to the core bar so as to cover the core bar, wherein the elastic body has a laminated structure so that its ground contact face side portion is formed out of a soft material while its core bar side portion is formed out of a hard material.

9. An elastic crawler shoe comprising a core bar fixed directly or through an iron shoe to crawler belt links, each of which is endlessly coupled, and an elastic body bonded to the core bar so as to cover the core bar, wherein the elastic body is so formed that its ground contact area gradually reduces from a central portion in a longitudinal direction of the elastic crawler shoe toward end portions thereof, and that in said end portions a slant face in each section orthogonal to the longitudinal direction of the elastic crawler shoe is formed into a circular arc.

10. An elastic crawler shoe comprising a core bar fixed directly or through an iron shoe to crawler belt links, each of which is endlessly coupled, and an elastic body bonded to the core bar so as to cover the core bar, wherein the elastic body has a ground contact face having grooves or incisions, the grooves in end portions in a longitudinal direction of the elastic crawler shoe are longer in length than the grooves in a central portion thereof, and a surface closest to the core bar of at least one of the grooves is provided with a wear indicator indicative of a wear limit of the elastic body.

11. An elastic crawler shoe comprising a core bar fixed directly or through an iron shoe to crawler belt links, each of which is endlessly coupled, and an elastic body bonded to the core bar so as to cover the core bar, wherein a central ground contact face in a longitudinal direction of the elastic crawler shoe is provided with stepped parts relative to end portions thereof so that the central ground contact face and the stepped parts are convex, the stepped parts each have grooves or incisions oriented in a direction transverse to the longitudinal direction of the elastic crawler shoe, and a starting point of each of the stepped parts is provided so as to be in alignment with or deviate outwardly from each end of a flat part of the core bar.

* * * * *